United States Patent
Gongola et al.

(10) Patent No.: US 9,495,892 B2
(45) Date of Patent: Nov. 15, 2016

(54) LIGHT-EMITTING DIODE EDGE LIGHTED AIRFIELD GUIDANCE SIGN

(71) Applicants: Paul Gongola, Enfield, CT (US); John Schneider, West Springfield, MA (US)

(72) Inventors: Paul Gongola, Enfield, CT (US); John Schneider, West Springfield, MA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 79 days.

(21) Appl. No.: 14/463,482

(22) Filed: Aug. 19, 2014

(65) Prior Publication Data

US 2015/0055370 A1 Feb. 26, 2015

Related U.S. Application Data

(60) Provisional application No. 61/868,368, filed on Aug. 21, 2013.

(51) Int. Cl.
*F21V 7/04* (2006.01)
*G09F 13/18* (2006.01)
(Continued)

(52) U.S. Cl.
CPC ............... *G09F 13/18* (2013.01); *B64F 1/002* (2013.01); *G02B 6/0088* (2013.01); *F21W 2111/06* (2013.01); *G09F 2013/049* (2013.01); *G09F 2013/1831* (2013.01); *G09F 2013/1881* (2013.01); *G09F 2013/222* (2013.01)

(58) Field of Classification Search
CPC ........... G09F 13/18; G09F 2013/1831; G09F 2013/1881; G09F 2013/049; G09F 2013/222; G09F 13/1881; G02B 6/0088; B64F 1/002; F21W 2111/06
USPC ......... 362/97.3, 618, 633, 612; 40/584, 549, 40/544, 546
See application file for complete search history.

(56) References Cited

U.S. PATENT DOCUMENTS 823,459 A 6/1906 Batchelder
2,865,124 A 12/1958 Mortellito
(Continued)

FOREIGN PATENT DOCUMENTS

AT WO 2014019700 A1 * 2/2014 ......... G09F 13/0413
EP 2487673 8/2012
(Continued)

OTHER PUBLICATIONS

Lukashina, E., International Search Report and Written Opinion of the International Searching Authority for PCT/US2014/051742, completed on Nov. 7, 2014, mailing date Nov. 20, 2014, pp. 1-7.

*Primary Examiner* — Andrew Coughlin
*Assistant Examiner* — Glenn Zimmerman
(74) *Attorney, Agent, or Firm* — King & Spalding LLP

(57) ABSTRACT

A light-emitting diode (LED) airfield guidance sign is disclosed herein. The sign can include a waveguide having a first face and a first fastening mechanism disposed on a first outer perimeter of the waveguide adjacent to the first face. The sign can also include a front panel coupled to the first outer perimeter adjacent to the first face of the waveguide. The sign can further include at least one first LED array disposed adjacent to an edge of a plurality of edges of the waveguide, where the edge of the waveguide is substantially orthogonal to the first face of the waveguide. The sign can also include a pair of side frame supports that secures two opposing edges of the plurality of edges of the waveguide and the front panel. The sign can further include a power source that provides power to the at least one first LED array.

20 Claims, 4 Drawing Sheets

(51) Int. Cl.
  *F21V 8/00*        (2006.01)
  *B64F 1/00*        (2006.01)
  *F21W 111/06*         (2006.01)
  *G09F 13/04*          (2006.01)
  *G09F 13/22*          (2006.01)

(56) References Cited

U.S. PATENT DOCUMENTS

| | | | |
|---|---|---|---|
| 4,209,927 | A | 7/1980 | Donatelle |
| 4,263,738 | A | 4/1981 | Donatelle |
| 4,408,407 | A | 10/1983 | Bloom et al. |
| 4,641,448 | A | 2/1987 | Cobb et al. |
| 5,027,258 | A * | 6/1991 | Schoniger ............ G02B 6/0023 362/629 |
| D343,199 | S | 1/1994 | Kunzer |
| D433,713 | S | 11/2000 | Olivetti |
| 6,174,065 | B1 | 1/2001 | Schurch |
| 6,352,350 | B1 | 3/2002 | Ma |
| D457,918 | S | 5/2002 | Linko, Sr. |
| 6,471,388 | B1 | 10/2002 | Marsh |
| 6,493,975 | B1 | 12/2002 | Cobb et al. |
| 6,583,556 | B2 | 6/2003 | Oishi et al. |
| 6,750,996 | B2 | 6/2004 | Jagt et al. |
| D500,812 | S | 1/2005 | Nudo, Jr. |
| 6,946,975 | B2 | 9/2005 | Hansler et al. |
| 7,164,836 | B2 | 1/2007 | Wright et al. |
| 7,542,635 | B2 | 6/2009 | Coleman |
| 7,635,214 | B2 | 12/2009 | Perlo |
| 7,681,347 | B1 | 3/2010 | Welker et al. |
| D616,502 | S | 5/2010 | Kulikoff |
| 7,762,704 | B2 | 7/2010 | Brychell |
| D647,970 | S | 11/2011 | Strempack |
| 8,177,404 | B2 * | 5/2012 | Weng ........................ A47F 11/10 362/125 |
| 8,408,775 | B1 | 4/2013 | Coleman |
| 2003/0136037 | A1 * | 7/2003 | Huang ................. G09F 13/0413 40/575 |
| 2004/0004827 | A1 * | 1/2004 | Guest .................... G02B 6/0091 362/612 |
| 2004/0150981 | A1 * | 8/2004 | Katsuda ............... G02B 6/0088 362/620 |
| 2006/0242867 | A1 | 11/2006 | Choi |
| 2006/0291241 | A1 * | 12/2006 | Wojtowicz .............. G09F 13/04 362/604 |
| 2008/0049441 | A1 | 2/2008 | Lee |
| 2008/0186737 | A1 * | 8/2008 | Awai ...................... G02B 6/002 362/617 |
| 2008/0285274 | A1 * | 11/2008 | Jung ...................... F21S 8/032 362/240 |
| 2010/0027293 | A1 | 2/2010 | Li |
| 2010/0245109 | A1 | 9/2010 | Ashoff et al. |
| 2010/0319227 | A1 * | 12/2010 | Sanders .................. G09F 7/10 40/546 |
| 2011/0199784 | A1 | 8/2011 | Isobe et al. |
| 2012/0287674 | A1 | 11/2012 | Nichol et al. |
| 2012/0320627 | A1 | 12/2012 | Araki et al. |
| 2013/0016526 | A1 | 1/2013 | McCollum et al. |
| 2013/0083559 | A1 | 4/2013 | Oh |
| 2013/0088890 | A1 | 4/2013 | Knapp et al. |

FOREIGN PATENT DOCUMENTS

JP        8076113        3/1996
WO     2010125198      11/2010

* cited by examiner

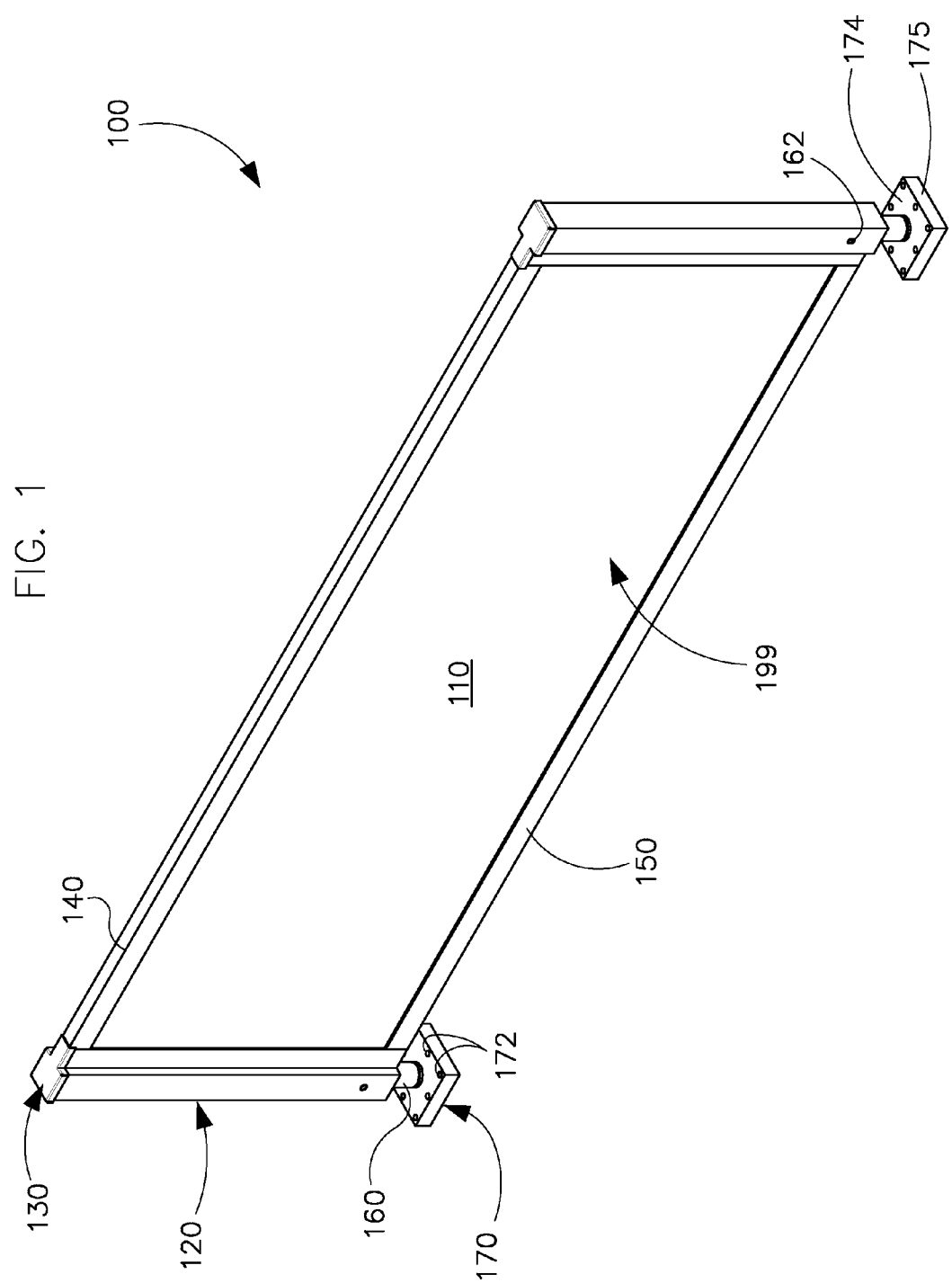

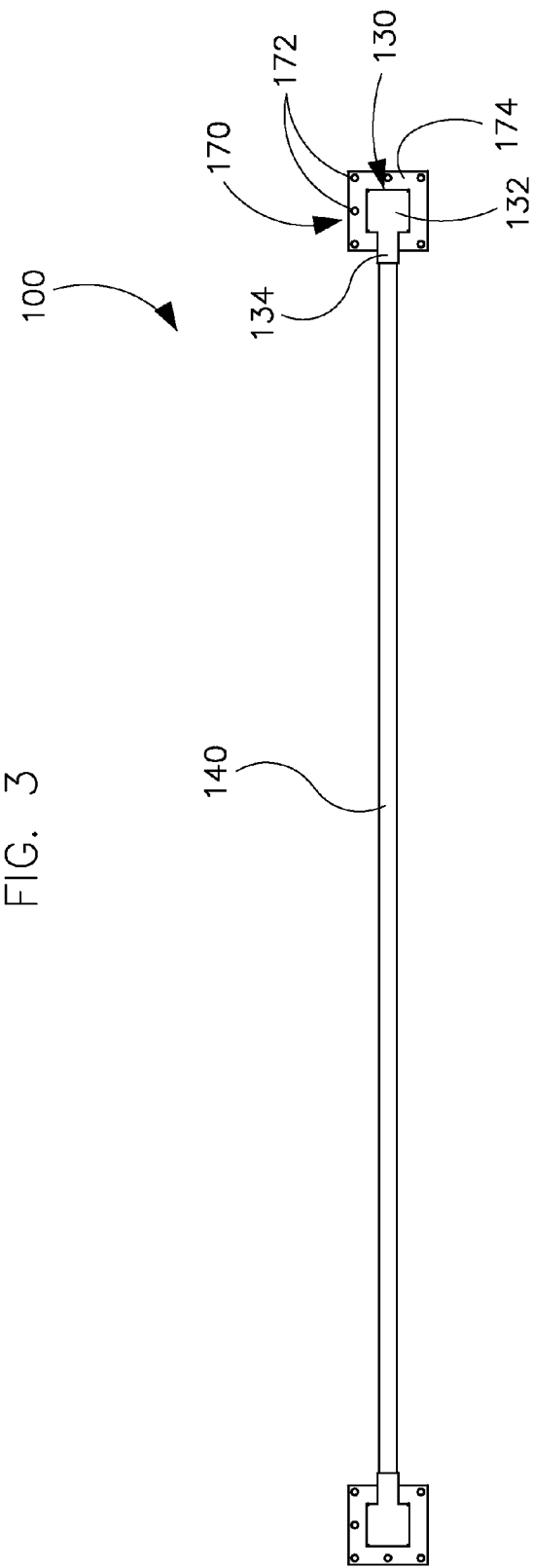

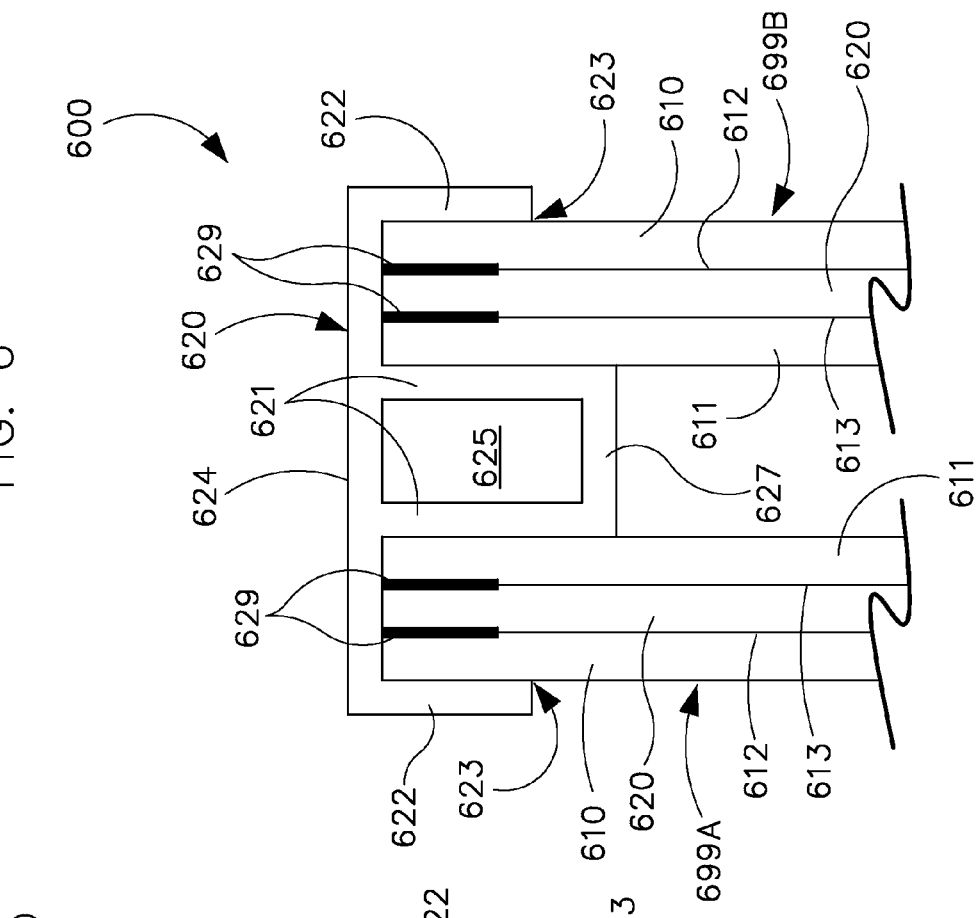
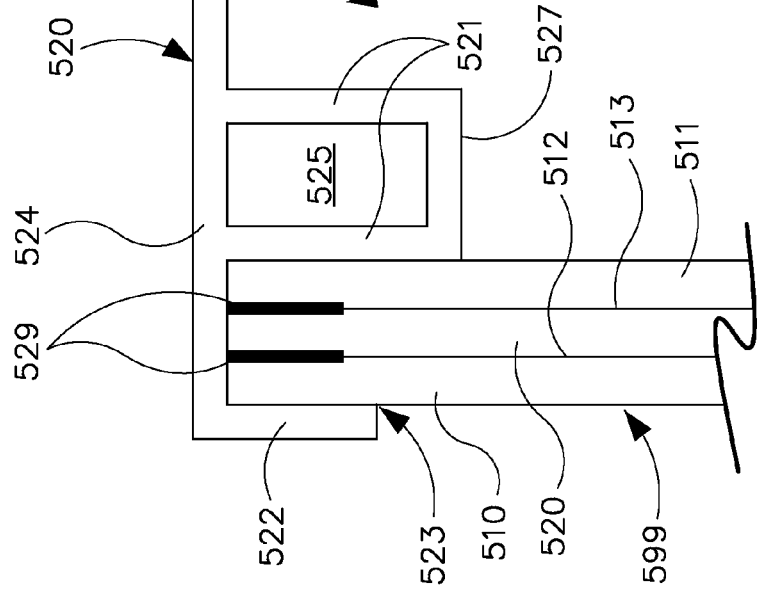

LIGHT-EMITTING DIODE EDGE LIGHTED AIRFIELD GUIDANCE SIGN

RELATED APPLICATIONS

The present application claims priority under 35 U.S.C.§119 to U.S. Provisional Patent Application No. 61/868,368, filed Aug. 21, 2013, and titled "Light-Emitting Diode Edge Lighted Airfield Guidance Sign," the entirety of which is incorporated herein by reference.

TECHNICAL FIELD

Embodiments described herein relate generally to airfield guidance signs, and more particularly to systems, methods, and devices for light-emitting diode (LED) edge lighted airfield guidance signs.

BACKGROUND

Airfield guidance signs serve an important purpose in safely and efficiently directing aircraft at an airfield. Airfield guidance signs are located outdoors, and so are subject to natural weather elements, including but not limited to high winds, moisture, hail, extreme heat, extreme cold, and high humidity. Airfield guidance signs also are subjected to the harsh conditions of an airfield, including high wind gusts created by aircraft and their engines. In addition, airfield guidance signs are subject to various regulations and standards so that a high degree of reliability is maintained.

SUMMARY

In general, in one aspect, the disclosure relates to a light-emitting diode (LED) airfield guidance sign. The LED airfield guidance sign can include a waveguide having a first face and a first fastening mechanism disposed on a first outer perimeter of the waveguide adjacent to the first face. The LED airfield guidance sign can also include a front panel coupled to the first outer perimeter adjacent to the first face of the waveguide. The LED airfield guidance sign can further include at least one first LED array disposed adjacent to an edge of a number of edges of the waveguide, where the edge of the waveguide is substantially orthogonal to the first face of the waveguide. The LED airfield guidance sign can also include a pair of side frame supports that secures two opposing edges of the edges of the waveguide and the front panel. The LED airfield guidance sign can further include a bottom frame support that secures a bottom edge of the edges of the waveguide and the front panel. The LED airfield guidance sign can also include a top frame support that secures a top edge of the edges of the waveguide and the front panel, where the top edge opposes the bottom edge. The LED airfield guidance sign can further include a power source that provides power to the at least one first LED array.

In another aspect, the disclosure can generally relate to light-emitting diode (LED) airfield guidance sign. The LED airfield guidance sign can include a first waveguide having a first fastening mechanism disposed on a first outer perimeter of the waveguide on a first front face and a first rear face of the first waveguide. The LED airfield guidance sign can also include a first front panel coupled to the first outer perimeter of the waveguide on the first front face of the first waveguide. The LED airfield guidance sign can further include at least one first LED array disposed adjacent to a side edge of a first number of edges of the first waveguide, where the side edge of the first waveguide is substantially orthogonal to the first front face of the first waveguide. The LED airfield guidance sign can also include a pair of side frame supports, where each side frame support comprises a first channel wall, a second channel wall, and a central portion disposed between the first channel wall and the second channel wall, wherein the first channel wall and the central portion form a first channel, and where the second channel wall and the central portion form a second channel. The LED airfield guidance sign can further include a first power source that provides power to the at least one first LED array. The first waveguide, the first front panel, the at least one first LED array, and the first power source can be disposed within the first channel.

These and other aspects, objects, features, and embodiments will be apparent from the following description and the appended claims.

BRIEF DESCRIPTION OF THE DRAWINGS

The drawings illustrate only example embodiments of airfield guidance signs and are therefore not to be considered limiting of its scope, as airfield guidance signs may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIG. 1 shows a front perspective view of an example airfield guidance sign in accordance with certain example embodiments.

FIG. 3 shows a top view of the example airfield guidance sign of FIG. 1 in accordance with certain example embodiments.

FIG. 4 shows a bottom view of the example airfield guidance sign of FIG. 1 in accordance with certain example embodiments.

FIG. 5 shows a cross-sectional top view of another airfield guidance sign in accordance with certain example embodiments.

FIG. 6 shows a cross-sectional top view of yet another airfield guidance sign in accordance with certain example embodiments.

DETAILED DESCRIPTION OF EXAMPLE EMBODIMENTS

Figures 2A, 2B:
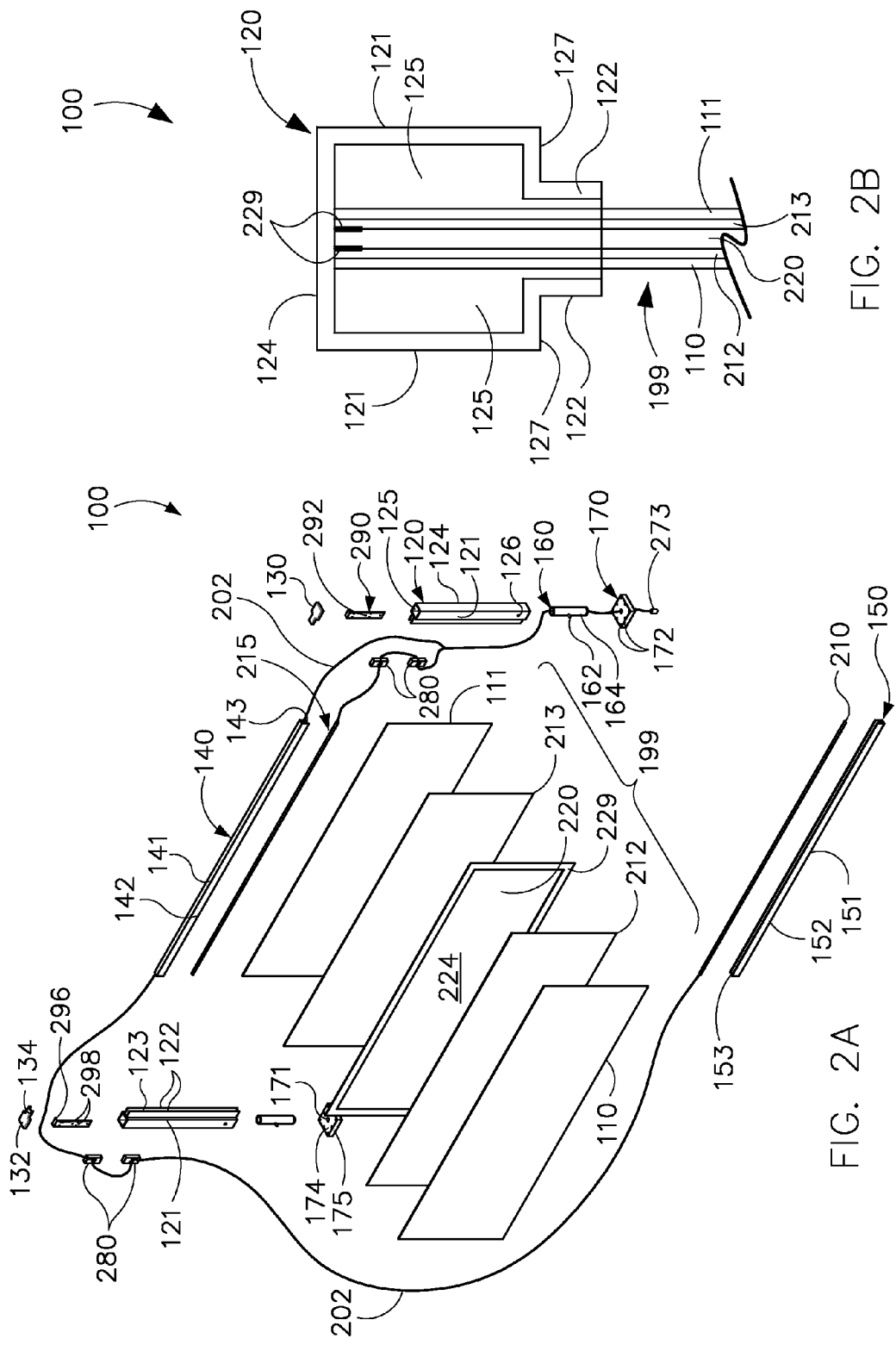
FIGS. 2A and 2B shows various views of the example airfield guidance sign of FIG. 1 in accordance with certain example embodiments.

The example embodiments discussed herein are directed to systems, methods, and devices for airfield guidance signs. Specifically, example embodiments may be directed to airfield guidance signs that are edge lighted using LEDs. Certain example embodiments provide a number of benefits. Examples of such benefits include, but are not limited to, a thinner profile than existing airfield guidance signs; compliance with government and/or industry regulations and/or standards; clearer, more uniform, and more reliable illumination of an airfield guidance sign; a more compact design; an airfield guidance sign that is easier to ship, handle, install, and maintain; lower power consumption; less prone to failure due to extremes in weather and other ambient conditions; simplified manufacturing, assembly, and installation; and reduced cost.

While the example embodiments described herein are directed to airfield guidance signs, example embodiments can also be used for signs for other applications. Examples of such other applications can include, but are not limited to, egress lighting, advertising, and parking Further, example embodiments can be used with one or more of a number of different types of lighting systems, including but not limited to light-emitting diode (LED) lighting systems, fluorescent lighting systems, organic LED lighting systems, incandescent lighting systems, and halogen lighting systems. Therefore, example embodiments described herein should not be considered limited to any particular type of application and/or lighting system.

Example embodiments of airfield guidance signs described herein can comply with one or more standards and/or regulations that apply to such signs. Such standards and/or regulations can be established and maintained by one or more entities. Examples of such an entity includes, but is not limited to, the Federal Aviation Administration (FAA), the International Civil Aviation Organization (ICAO), the Civil Aviation Branch of Transport Canada, and the European Aviation Safety Agency (EASA). An example of a standard is that an airfield guidance sign, such as the example airfield guidance signs described herein, must be able to withstand a 300 mile per hour wind load.

Any components (e.g., frame, junction box), or portions (e.g., features) thereof, described herein can be made from a single piece (as from a mold). In addition, or in the alternative, a component (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

When a component or portion thereof is made from a single piece, the single piece can be cut out, bent, stamped, and/or otherwise shaped to create certain features, elements, or other portions of a component. For example, as discussed below, at least a portion of the junction box and the flex connector can be made from a single sheet where various portions are cut out, bent, shaped, and otherwise manipulated to form an example component.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" or a "fastening mechanism" can couple, secure, fasten, and/or perform other functions aside from merely coupling or fastening. In addition, each component and/or feature described herein can be made of one or more of a number of suitable materials, including but not limited to metal, rubber, and plastic.

As described herein, a user can be any person that interacts with an example airfield guidance sign. Examples of a user may include, but are not limited to, an engineer, an electrician, a maintenance technician, a mechanic, an operator, a consultant, a contractor, and a manufacturer's representative.

Example embodiments of airfield guidance signs will be described more fully hereinafter with reference to the accompanying drawings, in which example embodiments of airfield guidance signs are shown. Airfield guidance signs may, however, be embodied in many different forms and should not be construed as being limited to the example embodiments set forth herein. Rather, these example embodiments are provided so that this disclosure will be thorough and complete, and will fully convey the scope of airfield guidance signs to those of ordinary skill in the art. Like, but not necessarily the same, elements (also sometimes called components) in the various figures are denoted by like reference numerals for consistency.

Terms such as "first," "second," "front," "rear," "top," "bottom," and "side," are used merely to distinguish one component (or part of a component or state of a component) from another. Such terms are not meant to denote a preference or a particular orientation. Also, the names given to various components described herein are descriptive of certain embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

FIGS. 1-4 show various views of an example airfield guidance sign 100 in accordance with certain example embodiments. Specifically, FIG. 1 shows a front perspective view of the airfield guidance sign 100. FIG. 2A shows an exploded view of the airfield guidance sign 100. FIG. 2B shows a cross-sectional top view of a portion of the airfield guidance sign 100. FIG. 3 shows a top view of the airfield guidance sign 100. FIG. 4 shows a bottom view of the airfield guidance sign 100. In one or more embodiments, one or more of the components shown in FIGS. 1-4 may be omitted, added, repeated, and/or substituted. Accordingly, embodiments of an airfield guidance sign should not be considered limited to the specific arrangements of components shown in FIGS. 1-4.

Referring to FIGS. 1-4, the airfield guidance sign 100 can include a front panel 110, a rear panel 111, a pair of side frame supports 120, a pair of side support caps 130, a top frame support 140, a bottom frame support 150, a pair of legs 160, a pair of mounting flanges 170, a bottom LED array 210, a top LED array 215, a front graphic panel 212, a rear graphic panel 213, a waveguide 220, one or more power sources 280, wires 202, one or more mounting brackets 290, and at least one plug 273. The front panel 110 (as well as other components of the airfield guidance sign 100, such as the rear panel 111, the front graphic panel 212, the rear graphic panel 213, and the waveguide 220) can fit within a portion of the pair of side frame supports 120, the top frame support 140, and/or the bottom frame support 150. For example, as shown in FIG. 1, the front panel 110 is surrounded on all sides by the pair of side frame supports 120, top frame support 140, and the bottom frame support 150. The front panel 110 can be clear, opaque, tinted, or have some other optical characteristic. The front panel can allow at least some light generated behind the front panel 110 to traverse the front panel 110 to outside the airfield guidance sign 100. The front panel 110 can be made from one or more of a number of materials, including but not limited to glass and plastic.

The rear panel 111 can be the same or different than the front panel 110. For example, the rear panel 111 can be completely opaque, while the front panel 110 is clear and translucent. As another example, both the rear panel 111 and the front panel 110 can be clear and translucent.

The waveguide 220 (also called, among other common names, a light guide) can be an optical device that receives light waves generated by a light source (e.g., bottom LED array 210, top LED array 215) along one or more edges (also sometimes called sides) of the waveguide 220. The light waves, once inside the waveguide 220, are eventually directed outward through a face (e.g., front face, rear face) of the waveguide 220 that is adjacent to and substantially orthogonal (perpendicular) to the edge through which the light waves enter the waveguide 220. The waveguide 220 can include one or more reflecting features, refracting features, and/or other optical features to generate a desired light output. For example, the configuration of the waveguide 220 can allow light output from the airfield guidance sign to meet requirements of one or more standards of the Federal Aviation Administration. The optical features of the waveguide 220 can polarize light waves that are transmitted therethrough. Alternatively, the optical features of the waveguide 220 can scatter light waves that are transmitted therethrough. The waveguide 220 can be made of one or more of a number of suitable materials. For example, the waveguide 220 can be acrylic, another type of thermoplastic, or a general plastic.

In certain example embodiments, the waveguide 220 includes a face 224 (e.g., front face, rear face) and a perimeter section 229 positioned adjacent to, and outside of, the face 224. The perimeter section 229 can exist on one or both sides of the waveguide 220. The perimeter section 229 can include adhesive or some other fastening mechanism (e.g., a clamp, an aperture, a slot, a tab) that is disposed on or applied to the waveguide 220 and used to couple the waveguide 220 to a panel (e.g., front panel 110, rear panel 111). The perimeter section 229 can be positioned around all or one or more portions of the perimeter of the waveguide 220. For example, as shown in FIG. 2A, the perimeter section 229 can be disposed around the entire perimeter of the waveguide 220.

The perimeter section 229 can be planar with the adjacent face 224 of the waveguide 220. In addition, or in the alternative, the perimeter section 229 can protrude forward relative to the adjacent face 224 of the waveguide 220 and/or be recessed from the adjacent face 224 of the waveguide 220. Similarly, the outer portion of the adjoining panel (e.g., front panel 110, rear panel 111) can have one or more recessed areas and/or one or more protruding areas that complement the protruding areas and/or recessed areas of the perimeter section 229 of the waveguide 220. The perimeter section 229 can be used to mechanically couple a panel (e.g., front panel 110, rear panel 111) and/or a graphic panel (e.g., front graphic panel 212, rear graphic panel 213) to the waveguide 220. In any case, the perimeter section 229 of the waveguide 220 allows a panel and/or a graphic panel to couple to the waveguide 220 while avoiding shadowing, uneven light distribution, flickering, and other undesirable optical results.

If an adhesive is used with the perimeter section, the adhesive can be any type of adhering material that maintains its adhesive properties despite changes in weather climate, temperature, and/or conditions. As an example, the adhesive can be a double-sided tape applied to the waveguide 220. In such a case, a type of bonding material can be used to fill in spaces or gaps left where pieces of the double-sided tape overlap or intersect. As another example, the adhesive can be an epoxy applied to the waveguide 220 shortly before coupling a graphic panel to the waveguide 220. If one or more clamps or similar fastening devices are used to couple together two or more components of the panel assembly 199, a component (e.g., the front graphic panel 212) of the panel assembly can be changed at a later time by loosening and retightening the clamp. As a result, the other components of the panel assembly 199 can be reused without replacing the entire panel assembly 199.

Optionally, the front graphic panel 212 can be positioned between the front panel 110 and the front face 224 of the waveguide 220. In addition, or in the alternative, graphics can be incorporated into the front panel 110 and/or the front face 224 of the waveguide 220. Similarly, the rear graphic panel 213 can be positioned between the rear panel 111 and the rear face 224 of the waveguide 220. In addition, or in the alternative, graphics can be incorporated into the rear panel 111 and/or the rear face 224 of the waveguide 220. In certain example embodiments, the rear panel 111 can be made of an opaque color. In such a case, the rear panel 111 and/or the rear graphic panel 213 can be made of a reflective material. The combination of the opaqueness of the rear panel 111 and the reflective material of the rear panel 111 and/or the rear graphic panel 213 can prevent light emitted by the LED arrays from showing through the rear panel 111.

If the front graphic panel 212 is used with the airfield guidance sign 100, then the front graphic panel 212 can be held in place by friction, without the use of an adhesive or other fastening mechanism, between the front panel 110 and the front face 224 of the waveguide 220. In addition, or in the alternative, the front graphic panel 212 can be adhered to at least a portion of the perimeter section 229 of the waveguide 220. The same can apply to the rear graphic panel 213 if the rear graphic panel 213 is used in the airfield guidance sign 100.

In certain example embodiments, the front panel 110, the rear panel 111, the wave guide 220, the optional front graphic panel 212, and the optional rear graphic panel 213, when coupled together, form the panel assembly 199. The panel assembly 199 can be disposed within the pair of side frame supports 120, the top frame support 140, and the bottom frame support 150. The top frame support 140 includes a back wall 141 and two side walls 142 that form a channel 143, and the bottom frame support 150 includes a back wall 151 and two side walls 152 that form a channel 153. The top end of the panel assembly 199 can be disposed within the channel 143 of the top frame support 140, and the bottom end of the panel assembly 199 can be disposed within the channel 153 of the bottom frame support 150. A panel assembly 199 can have one or more graphic signs (e.g., front graphic panel 212, rear graphic panel 213, waveguide 220), where each graphic sign has a display that is separate from the display of other graphic signs of the airfield guidance sign 100.

In addition, in certain example embodiments, the top frame support 140 and/or the bottom frame support 150 can have one or more other components (aside from the panel assembly 199) of the airfield guidance sign 100 disposed within its channel 143 and channel 153, respectively. For example, one or more wires 202 can be disposed in some or all of the channel 143 of the top frame support 140 and/or the channel 153 of the bottom frame support 150. As another example, as shown in FIG. 2A, one or more LED arrays (e.g., bottom LED array 210, top LED array 215) can be disposed in some or all of the channel 143 of the top frame support 140 and/or the channel 153 of the bottom frame support 150. In such a case, the top frame support 140 and/or the bottom frame support 150 in which an LED array is disposed can be made of one or more of a number of thermally conductive materials (e.g., metal) to absorb heat generated by the LED array and dissipate such heat outside of the airfield guidance sign 100. The LED arrays described herein may include any type of LED technology, including, but not limited to, chip on board and discrete die.

The top frame support 140 and the bottom frame support 150 can be substantially the same (e.g., with regard to dimensions, size of channel 143 and channel 153, features) as each other or different than each other. The top frame support 140 and the bottom frame support 150 can have a length that is substantially similar to, or slightly less than, the length of the panel assembly 199. In addition, the size (e.g., width) of the channel 143 of the top frame support 140 and the channel 153 of the bottom frame support 150 can be substantially similar to, or slightly less than, the corresponding dimensions (e.g., thickness) of the panel assembly 199. In such a case, when the panel assembly 199 is disposed in the channel 143 of the top frame support 140 and the channel 153 of the bottom frame support 150, little to no external elements (e.g., moisture, dust) can reach between components of the panel assembly 199 from within such channels.

In certain example embodiments, each wall 142 of the top frame support 140 and each wall 152 of the bottom frame support 150 can extend from the back wall 141 and the back wall 151, respectively, at some angle (e.g., substantially parallel, acutely, obtusely). In certain example embodiments, top frame support 140 and the bottom frame support 150 are oriented with respect to each other in such a way that the channel 143 and the channel 153 open toward each other. In such a case, the front panel 110 and, in some cases, the front graphic panel 212, can be disposed within the U-shaped panel formed by an extended portion that extends along the front side of the top frame support 140 and/or the bottom frame support 150. Similarly, the rear panel 111 and, in some cases, the rear graphic panel 213, can be disposed within the U-shaped panel formed by an extended portion that extends along the back side of the top frame support 140 and/or the bottom frame support 150.

To help ensure that little to no external elements (e.g., moisture, dust) can reach between components of the panel assembly 199, the top frame support 140 and/or the bottom frame support 150 can include one or more additional features and/or components. For example, the bottom frame support 150 can include a groove disposed along one or both of its side walls 152 and a sealing member (e.g., a gasket) that is disposed within each groove. In such a case, the sealing member can be in contact with the lower outer perimeter of the panel assembly 199 on the front and/or back side. Similar features can be added to the channel walls 122 of the side frame supports 120, described below.

The pair of side frame supports 120 can be substantially symmetrical to each other, with one side frame support 120 being positioned on one side of the airfield guidance sign 100, and the other side frame support 120 being positioned on the other side of the airfield guidance sign 100. Each side frame support 120 can have one or more features, disposed inside and/or outside of the side frame support 120, to house various components of the airfield guidance sign 100. For example, each side frame support 120 can include a back wall 124, one or more side walls 121, and one or more channel walls 122 that extend outward from a front wall 127. A cavity 125 is formed by the back wall 124, the side walls 121, and the front wall 127, and a channel 123 is formed between the channel walls 122. The cavity 125 and the channel 123 can overlap, as when there is an opening in the front wall 127 that coincides with the channel 123. Alternatively, the front wall 127 can be continuous between the channel walls 122, thus creating a physical separation between the channel 123 and the cavity 125. Each channel wall 122 can extend from the front wall 127 and/or back wall 124 of the side frame support 120 at some angle (e.g., substantially perpendicularly, acutely, obtusely).

In certain example embodiments, the channel walls 122 form a channel 123, and walls 127, walls 121, and wall 124 forms the cavity 125 of the side frame support 120, where the channel 123 opens toward the opposite side frame support 120. In such a case, the panel assembly 199 (e.g., the front panel 110, the optional front graphic panel 212, the waveguide 120, the rear panel 111, and the optional rear graphic panel 213) can be disposed within the channel 123 formed by one or more channel walls 122 that extend from the front wall 127 of the side frame support 120. In some cases, these portions of the panel assembly 199 can also extend into the cavity 125 of the side frame support 120.

In certain example embodiments, one or both of the side frame supports 120 can have alternative configurations. For example, there may be no channel walls 122 extending from wall 127 and forming channel 123. Instead, wall 127 merely has an opening through which the waveguide 220, the front panel 110, the rear panel 111, the optional front graphic panel 212, and the optional rear graphic panel 213 can be disposed. In such a case, channel 123 does not exist, and the cavity 125 is formed substantially the same as described above. Other alternative configurations of the side frame support 120 are described below with respect to FIGS. 5 and 6.

In some cases, a double-sided sign can be disposed in the channels 123 of the side frame supports 120. For example, the panel assembly 199 can include, from one side to another, a front panel 110, an optional front graphic panel 212, a waveguide 220, a rear panel 111, another waveguide 220, another optional front graphic panel 212, and another front panel 110. As another example, the panel assembly 199 can include, from one side to another, a front panel 110, an optional front graphic panel 212, a waveguide 220 (capable of emitting light through both front and back surfaces), another optional front graphic panel 212, and another front panel 110. In any case, the channel 123 formed by the channel walls 122 can be separated by the appropriate distance to securely couple to the panel assembly 199.

If there are multiple waveguides 220 in a panel assembly 199 (i.e., there are multiple graphic signs in the panel assembly 199), each waveguide 220 can have one or more sign components (e.g., LED array 210, LED array 215, power supplies 280) that act independently of the components used for the graphic sign associated with the other waveguide 220. In addition, or in the alternative, the two graphic signs (including waveguides 220) can share one or more frame components (e.g., side frame support 120, bottom frame support 150, top frame support 140). Alternatively, as in the example embodiment of FIG. 6, there can be a top frame support 140 and/or a bottom frame support 150 for each graphic sign, while the two graphic signs of the panel assembly 199 can share the side frame supports 120. With a double-sided sign, the front graphic panel 212 for one of the graphic signs of the panel assembly 199 can have the same features (e.g., graphics, colors) as, or different features than, the front graphic panel 212 for the graphic sign of the panel assembly 199 facing the other side. In certain example embodiments, the channel 123 of the side frame support 120 can be substantially similar, in terms of shape and function, to a channel of the top frame support 140 and/or a channel of the bottom frame support 150, except that the channel 123 of the side frame support 120 interacts with the sides, rather than the top and bottom, respectively, of the panel assembly 199.

The cavity 125 of the side frame supports 120 can be used to house one or more of a number of components of the airfield guidance sign 100. In addition to a portion of the panel assembly 199, the cavity 125 of the side frame supports 120 can be used to house, for example, one or more wires 202, one or more LED arrays, one or more power sources 280, one or more optional mounting brackets 290, and one or more retaining posts 160. Each power source 280 can provide power to some or all of the LED arrays (e.g., LED array 210, LED array 215) used by a panel assembly 199.

Each power source 280 can be any component or group of components that receive power and, using the received power, output power in a format (alternating current (AC), direct current (DC)) and in a level (e.g., 12V DC, 0-10V DC, 120V AC) used by the LED arrays that are coupled to the power source 280. The power received by the power source 280 can be transformed, inverted, converted, or otherwise manipulated so that the output power delivered to the LED arrays is in the proper format and voltage level. Alternatively, rather than receiving power, the power source 280 can generate power, as from a battery or a photovoltaic solar array.

One or more power sources 280 can be mechanically coupled to (mounted on) an optional mounting bracket 290. A mounting bracket 290 can include a body 292 and one or more of a number of coupling features 294 (e.g., apertures, grooves, slots, tabs) that can be used to couple one or more power sources 280 thereto. A mounting bracket 290 can also include one or more other coupling features 296 (e.g., apertures, grooves, slots, tabs) that allow the mounting bracket 290 to mechanically couple to a side frame support 120. In certain example embodiments, the coupling features 294 and the coupling features 296 are the same features. The mounting bracket 290 can be disposed on an outer surface of a wall (e.g., back wall 124, side wall 121) of a side frame support 120 or inside the cavity 125 of a side frame support 120.

Alternatively, the power sources 280 can be mounted within a mounting feature of the side frame support 120. Such a mounting feature can be disposed on an outer surface of a wall (e.g., back wall 124, side wall 121) of a side frame support 120 or inside the cavity 125 of a side frame support 120. For example, one or more recesses can be disposed on an inner surface of a wall (e.g., back wall 124, side wall 121) within the cavity 125 of a side frame support 120. In such a case, the recesses can be shaped and sized in such a way that one or more power sources 280 can be secured thereto. When there are multiple graphic signs, whether part of the same panel assembly 199 or different panel assemblies, each graphic sign can have one or more of its own power sources 280. In such a case, the power source 280 for one graphic sign can receive power independently of (be on a separate circuit from) the power source 280 for the other graphic signs. Alternatively, two or more graphic signs can be on the same electrical circuit, regardless of whether the graphic signs share a power source 280 or have their own power sources 280.

In certain example embodiments, the airfield guidance sign 100 includes one or more of a number of sensing devices (not shown). Each sensing device can be used to monitor and/or measure a condition. For example, a sensing device can be used to sense motion, as with a passing aircraft. In such a case, and when the airfield guidance sign 100 includes multiple graphic signs (e.g., there is a single panel assembly 199 that is double-sided), the electrical configuration of the power sources 280 within the airfield guidance sign 100 can allow the airfield guidance sign 100 to comply with one or more of a number of standards. For example, example guidance signs 100 can be used to comply with Advisory Circular 120-57 (also called the Surface Movement Guidance and Control System), which allows for taxiing capabilities in low visibility conditions and reducing the potential for runway incursions.

Due to heat that may be generated by the one or more power sources 280 and/or one or more LED arrays, the side frame supports 120 can be made of one or more of a number of thermally conductive materials (e.g., aluminum, steel). Such thermally conductive materials can absorb heat generated by the power sources 280 and/or the LED arrays and dissipate such heat outside of the airfield guidance sign 100. In certain example embodiments, the power source 280 can be mounted on one or more other components (e.g., the top frame support 140, the bottom frame support 150) of the airfield guidance sign 100.

The retaining posts 160 can be disposed toward the bottom end of a side frame support 120. The retaining posts 160 can be mechanically coupled to a side frame support 120 and a mounting flange 170. In certain example embodiments, the retaining posts 160 are frangible (e.g., have a frangible groove disposed in the retaining post 160). In such a case, the airfield guidance sign 100, less the mounting flanges 170, can fall (no longer remain upright) under certain conditions. For example, the frangibility of the retaining posts 160 can be set so that, for a given airfield guidance sign 100, the retaining posts 160 will fail when a force generated by a wind of a certain speed (e.g., 300 miles per hour) is reached, allowing a ground-mounted airfield guidance sign 100 to fall to the ground.

Each retaining post 160 can have one or more walls 164 that form one or more of a number of shapes when viewed cross-sectionally. Such shapes can include, but are not limited to, circular, oval, square, rectangular, and hexagonal. Each retaining post 160 can also include one or more fastening features that allow the retaining post 160 to mechanically couple to a side frame support 120 and/or a mounting flange 170. For example, as shown in FIGS. 1 and 2A, the retaining post 160 can include a retaining pin 162 that extends laterally from a wall 164 of the retaining post 160 and extends into an aperture 126 in a wall (e.g., a side wall 121, as shown in FIG. 2A) of the side frame support 120. In such a case, the retaining pin 162 can be retractable, allowing the retaining pin 162 to snap outward into the aperture 126 when the retaining post 160 and the side frame support 120 are properly aligned.

As another example, the retaining pin 162 can have a threaded aperture (not shown) in a wall 164 of the retaining post 160, allowing a user to screw the retaining pin 162 into the aperture in the wall 164 of the retaining post 160 while the retaining pin 162 protrudes through the aperture 126 in a wall (e.g., a side wall 121, as shown in FIG. 2A) in the side frame support 120. In any case, when the retaining post 160 is aligned with and coupled to the side frame support 120, the retaining pin 162 can be substantially flush with, or protrude beyond, the outer surface of a wall (e.g., a side wall 121, as shown in FIG. 2A) of the side frame support 120.

As an example of a feature that allows the retaining post 160 to mechanically couple to a mounting flange 170, the bottom surface of the retaining post 160 can have a fastening receiver (not shown) (e.g., a threaded aperture in a wall, a slot). In such a case, a plug 273 can extend through a central aperture 171 in a mounting flange 170 and mechanically (e.g., threadably) couple to the fastening receiver (e.g., threaded aperture) disposed on the bottom of the retaining post 160. The mounting flanges 170 can include, in addition to the central aperture 171, a number of other apertures 172 disposed proximate to the perimeter 175 of the body 174 of the mounting flange 170. The mounting flange 170 can have any of a number of characteristics (e.g., thickness, cross-sectional shape, orientation and number of apertures 172) that allow the mounting flange 170 to mount (couple to) a fastening device and/or mounting feature in an airfield.

In certain example embodiments, a retaining post 160 can be "reversible" for different standards. In such a case, each end of the retaining post 160 can have a fastening feature, and there can be multiple frangible features disposed on the retaining post 160. For example, a retaining post 160 could have a first orientation (e.g., right-side up) where a first frangible groove that is designed to withstand a first wind load (e.g., 200 mph) is used, as well as a second orientation (e.g., upside down) where a second frangible groove that is designed to withstand a second wind load (e.g., 300 mph). In this way, a single sign can meet one or more sets of standards when the retaining posts 160 are oriented one way, and that single sign can meet one or more other sets of standards when the retaining posts 160 are oriented in another way.

In certain example embodiments, the mounting flange 170 can have one or more other features, have one or more other components, and have one or more of a number of other shapes. In other words, the mounting flange 170 can be any suitable mounting system. For example, the mounting flange 170 can be a pedestal, as shown in FIGS. 126 and 127 of FAA AC 150/5340-30G.

At the top end of each side frame support 120 can be disposed a top cap 130. Each top cap 130 can have a shape and features that allow the top cap 130 to couple to the top end of the side frame support 120 and, in some cases, an end of the top frame support 140. In other words, the base portion 132 of the top cap 130 can have a shape that is substantially the same (and at least as large as) the cross-sectional shape of the cavity 125 of the side frame support 120. The distal portion 134 of the top cap 130, which extends from the base portion 132, can have a shape that is substantially the same (and at least as large as) the cross-sectional shape of the channel 123 of the side frame support 120, which can also be substantially the same as the cross-sectional shape of the top wall 141 of the top frame support 140.

The top cap 130 can mechanically couple to the side frame support 120 and, in some cases, an end of the top frame support 140 using one or more of a number of fastening methods. Examples of such fastening methods can include, but are not limited to, snap fittings, pressure fittings, welding, fusion, fastening devices, and mating threads.

FIG. 5 shows a cross-sectional top view of a portion of another airfield guidance sign 500 in accordance with certain example embodiments. FIG. 6 shows a cross-sectional top view of a portion of yet another airfield guidance sign 600 in accordance with certain example embodiments. In one or more embodiments, one or more of the components shown in FIGS. 5 and 6 may be omitted, added, repeated, and/or substituted. Accordingly, embodiments of an airfield guidance sign should not be considered limited to the specific arrangements of components shown in FIGS. 5 and 6.

The airfield guidance sign 500 of FIG. 5 and the airfield guidance sign 600 of FIG. 6 are substantially similar to the airfield guidance sign 100 of FIGS. 1-4, except as described below. Any component described in FIG. 5 or 6 can apply to a corresponding component described in FIGS. 1-4. In other words, the description for any component of FIG. 5 or 6 can be considered substantially the same as the corresponding component described with respect to FIGS. 1-4. Further, if a component of FIG. 5 or 6 is described but not expressly shown or labeled in FIG. 5 or 6, such component can be inferred from the corresponding component of FIGS. 1-4. Conversely, if a component in FIG. 5 or 6 is labeled but not described, the description for such component can be substantially the same as the description for the corresponding component with respect to FIGS. 1-4. The numbering scheme for the components in FIGS. 5 and 6 herein parallels the numbering scheme for the components of FIGS. 1-4 in that each component is a three digit number having the identical last two digits.

Referring to FIGS. 1-6, the cross-sectional profile of each side frame support 520 of FIG. 5 is substantially the same as the cross-sectional profile of each side frame support 620 of FIG. 6. Further, the cross-sectional profile of each side frame support 520 of FIG. 5 and the cross-sectional profile of each side frame support 620 of FIG. 6 each differs from the cross-sectional profile of the side frame support 120 of FIGS. 1-4.

The airfield guidance sign 500 of FIG. 5 shows a side frame support 520 that is configured differently than the side frame support 120 of FIGS. 1-4. In this case, the two channel walls 522 extend from the back wall 524 of the side frame support 520. Each channel wall 522 can extend from the back wall 524 at any angle (e.g., substantially perpendicular, obtusely, acutely). Further, each channel wall 522 forms a channel 523 with a side wall 521, which also extends from the back wall 524. A front wall 527 abuts against the side wall 521 on a side opposite from that of the back wall 524, forming the cavity 525. As shown in FIG. 5, a panel assembly 599 can be disposed within one of the channels 523.

The side frame support 620 for the airfield guidance sign 600 of FIG. 6 is substantially the same as the side frame support 520 for the airfield guidance sign 500 of FIG. 5. When there are two physically separate panel assemblies, as with the airfield guidance sign 600 of FIG. 6, a separate panel assembly (in this case, panel assembly 699A and panel assembly 699B) can be disposed in each of the channels 623 of the side frame support 620. Each panel assembly in this example can be a single-sided sign facing in opposite directions from each other. In such a case, the rear panel 611 and/or the optional rear graphic panel 613 of each panel assembly, which are positioned adjacent to each other within the channels 623 of the side frame supports 620, can be opaque and/or reflective. In such a case, an optional front graphic panel 612 for one of the panel assemblies (e.g., panel assembly 699A) can be the same as or different than the other front graphic panel 612 for the other panel assembly (e.g., panel assembly 699B). Alternatively, each of the pair of panel assemblies can be double-sided, in which case the rear panel 611 and/or the optional rear graphic panel 613 for each graphic sign can be translucent. In such a case, the front graphic panel 612 for one of the graphic signs can be the same as the other front graphic panel 612 for the other graphic sign.

The two configurations of side frame supports (e.g., side frame support 620, side frame support 120) shown and described herein are merely examples, and so side frame supports used with example embodiments can have other configurations not expressly shown or described herein. In any case, each side frame support is configured to receive a portion of one or more panel assemblies in its channels and one or more components (e.g., LED array, power source) of an airfield guidance sign in its cavity. In addition, while not expressly shown or described, the top frame support and/or the bottom frame support can have varying configurations for receiving one or more panel assemblies and/or one or more other components (e.g., LED array, power source) of an airfield guidance.

The systems and methods described herein allow for LED technology to be used in an airfield guidance sign. Example embodiments disclose unique and novel ways that components of a panel assembly can be coupled to each other without significantly diminishing the optical quality of the airfield guidance sign. Example embodiments can be used in airport runway environments and comply with applicable standards for such environments. Example embodiments also allow for reduced manufacturing time, materials, and costs. Example embodiments also provide for increased reliability and simplified maintenance.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light-emitting diode (LED) airfield guidance sign, comprising:
    a waveguide comprising a first face and a first outer perimeter that surrounds the first face;
    a front panel disposed adjacent to the first face and the first outer perimeter of the waveguide;
    an adhesive disposed on the front panel and the first outer perimeter of the waveguide adjacent to the first face;
    at least one first LED array disposed adjacent to an edge of a plurality of edges of the waveguide, wherein the edge of the waveguide is substantially orthogonal to the first face of the waveguide;
    a pair of side frame supports that secures two opposing edges of the plurality of edges of the waveguide and the front panel;
    a bottom frame support that secures a bottom edge of the plurality of edges of the waveguide and the front panel;
    a top frame support that secures a top edge of the plurality of edges of the waveguide and the front panel, wherein the top edge opposes the bottom edge; and
    a power source that provides power to the at least one first LED array,
    wherein the first outer perimeter and the adhesive are disposed within a cavity of the pair of side frame supports and a channel of the top frame support and the bottom frame support, and
    wherein the adhesive is hidden from view by the pair of side frame supports, the bottom frame support, and the top frame support.

2. The LED airfield guidance sign of claim 1, further comprising:
    a clamp that further couples the front panel to the first outer perimeter of the waveguide.

3. The LED airfield guidance sign of claim 1, wherein the at least one first LED array is disposed within the channel of the bottom frame support, wherein the bottom frame support is made of a first thermally conductive material.

4. The LED airfield guidance sign of claim 1, further comprising:
    a front graphic panel disposed between the front panel and the first face of the waveguide.

5. The LED airfield guidance sign of claim 1, further comprising:
    a rear panel coupled to the first outer perimeter of the waveguide disposed on a second face of the waveguide.

6. The LED airfield guidance sign of claim 1, further comprising:
    a pair of retaining posts, wherein each retaining post of the pair of retaining posts is mechanically coupled to the each side frame support of the pair of side frame supports using a retaining pin;
    a pair of mounting flanges, wherein each mounting flange of the pair of mounting flanges is mechanically coupled to each retaining post of the pair of retaining posts using a first fastening device; and
    a plurality of second fastening devices that mechanically couple the pair of mounting flanges to a mounting surface.

7. The LED airfield guidance sign of claim 1, wherein the power source is disposed in the cavity of at least one of the pair of side frame supports, and wherein the power source is electrically coupled to the at least one first LED array using at least one conductor.

8. The LED airfield guidance sign of claim 1, further comprising:
    a pair of top caps, wherein the pair of top caps are mechanically coupled to a top end of the pair of side frame supports and to an end of the top frame support.

9. The LED airfield guidance sign of claim 1, wherein the first outer perimeter of the waveguide is recessed relative to the first face of the waveguide.

10. The LED airfield guidance sign of claim 5, further comprising:
    a rear graphic panel disposed between the rear panel and the second face of the waveguide.

11. The LED airfield guidance sign of claim 6, wherein each of the pair of retaining posts is frangible.

12. The LED airfield guidance sign of claim 10, wherein the rear graphic panel is made of a reflective material, and wherein the rear panel is opaque.

13. The LED airfield guidance sign of claim 11, wherein each of the pair of retaining posts has a first orientation and a second orientation, wherein first orientation is used to comply with a first standard, and wherein the second orientation is used to comply with a second standard.

14. A light-emitting diode (LED) airfield guidance sign, comprising:
    a first waveguide comprising a first fastening mechanism disposed on a first outer perimeter of the waveguide on a first front face and a first rear face of the first waveguide;
    a first front panel coupled to the first outer perimeter of the waveguide on the first front face of the first waveguide;
    at least one first LED array disposed adjacent to a side edge of a first plurality of edges of the first waveguide, wherein the side edge of the first waveguide is substantially orthogonal to the first front face of the first waveguide;
    a pair of side frame supports, wherein each side frame support comprises a first channel wall, a second channel wall, and a central portion disposed between the first channel wall and the second channel wall, wherein the first channel wall and the central portion form a first channel, and wherein the second channel wall and the central portion form a second channel; and a first power source that provides power to the at least one first LED array, wherein the first waveguide, the first front panel, the at least one first LED array, and the first power source are disposed within the first channel.

15. The LED airfield guidance sign of claim 14, further comprising:
a bottom frame support that secures a bottom edge of the first plurality of edges of the first waveguide and the first front panel; and
a top frame support that secures a top edge of the first plurality of edges of the first waveguide and the first front panel.

16. The LED airfield guidance sign of claim 14, further comprising:
a second waveguide comprising a second fastening mechanism disposed on a second outer perimeter of the waveguide on a second front face and a second rear face of the second waveguide;
a second front panel coupled to the second outer perimeter of the waveguide on the second front face of the second waveguide;
at least one second LED array disposed adjacent to a side edge of a second plurality of edges of the second waveguide, wherein the side edge of the second waveguide is substantially orthogonal to the second front face of the second waveguide; and
a second power source that provides power to the at least one second LED array, wherein
the second waveguide, the second front panel, the at least one second LED array, and the second power source are disposed within the second channel, and wherein
the first front panel is faced in an opposite direction from the second front panel.

17. The LED airfield guidance sign of claim 16, further comprising:
a first bottom frame support that secures a bottom edge of the first plurality of edges of the first waveguide and the first front panel;
a first top frame support that secures a top edge of the first plurality of edges of the first waveguide and the first front panel;
a second bottom frame support that secures a bottom edge of the second plurality of edges of the second waveguide and the second front panel; and
a second top frame support that secures a top edge of the second plurality of edges of second waveguide and the second front panel.

18. The LED airfield guidance sign of claim 16, further comprising:
a bottom frame support that secures a bottom side of the first waveguide, the first front panel, the second waveguide, and the second front panel; and
a top frame support that secures a top side of the first waveguide, the first front panel, the second waveguide, and the second front panel.

19. The LED airfield guidance sign of claim 16, wherein the first power source operates independently of the second power source.

20. A light-emitting diode (LED) airfield guidance sign, comprising:
a waveguide comprising a first face and a first outer perimeter that surrounds the first face;
a front panel disposed adjacent to the first face and the first outer perimeter of the waveguide;
at least one clamp that couples the front panel to the first outer perimeter of the waveguide;
at least one first LED array disposed adjacent to an edge of a plurality of edges of the waveguide, wherein the edge of the waveguide is substantially orthogonal to the first face of the waveguide;
a pair of side frame supports that secures two opposing edges of the plurality of edges of the waveguide and the front panel;
a bottom frame support that secures a bottom edge of the plurality of edges of the waveguide and the front panel;
a top frame support that secures a top edge of the plurality of edges of the waveguide and the front panel, wherein the top edge opposes the bottom edge; and
a power source that provides power to the at least one first LED array,
wherein the first outer perimeter and the at least one clamp are disposed within a cavity of the pair of side frame supports and a channel of the top frame support and the bottom frame support, and
wherein the at least one clamp is hidden from view by the pair of side frame supports, the bottom frame support, and the top frame support.

* * * * *